No. 695,474. Patented Mar. 18, 1902.
J. McFARLANE & D. C. REINOHL.
PROCESS OF EXTRACTING OIL FROM COTTON SEED.
(Application filed Aug. 29, 1901.)
(No Model.)
1
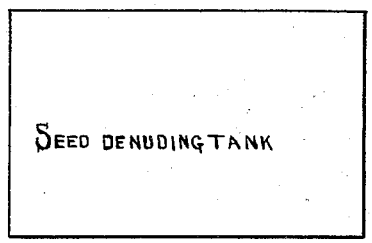
SEED DENUDING TANK
2
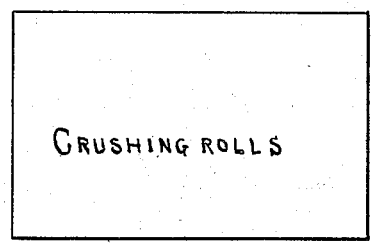
CRUSHING ROLLS
4
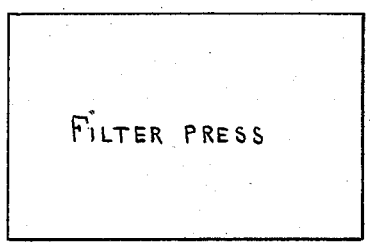
FILTER PRESS
3
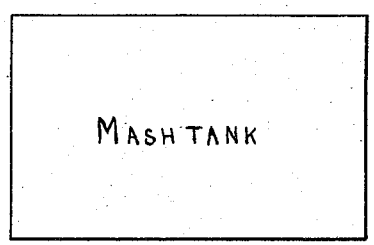
MASH TANK
5
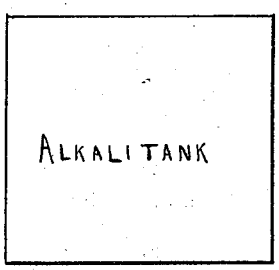
ALKALI TANK
6
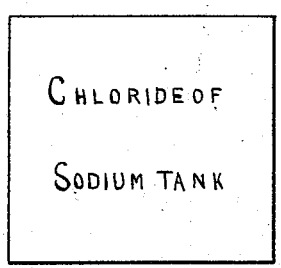
CHLORIDE OF SODIUM TANK
7
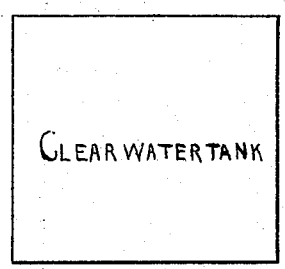
CLEAR WATER TANK
Witnesses
Inventors
John McFarlane
David C. Reinohl
By D. C. Reinohl Attorney

UNITED STATES PATENT OFFICE.

JOHN McFARLANE AND DAVID C. REINOHL, OF WASHINGTON, DISTRICT OF COLUMBIA.

PROCESS OF EXTRACTING OIL FROM COTTON-SEED.

SPECIFICATION forming part of Letters Patent No. 695,474, dated March 18, 1902.

Application filed August 29, 1901. Serial No. 73,675. (No specimens.)

*To all whom it may concern:*

Be it known that we, JOHN McFARLANE and DAVID C. REINOHL, citizens of the United States, residing at Washington, in the District of Columbia, have invented certain new and useful Improvements in Processes of Extracting Oil from Cotton-Seed; and we do hereby declare the following to be a full, clear, and exact description of the invention, such as will enable others skilled in the art to which it appertains to make and use the same.

Our invention relates to the art of treating cotton-seed for extracting oil therefrom, has for its object a rapid and perfect removal of the hulls from the seed before the oil is extracted from the latter; and it consists in certain steps of treatment, which will be fully disclosed in the following specification and claims.

Cotton-seed as they come from the gin incased in their hulls and lint or delinted seed are immersed in a solution of potash, caustic soda, or concentrated lye of commerce properly diluted, or either of them, and saccharine matter in which some fermentation has taken place and corrosive agents have been developed or in which corrosive agents have been developed by the action of foreign agents, such saccharine matter being preferably black molasses, known to the trade as "black-strap," or other heavy molasses or brown sugar, the solution being contained in a suitable receptacle, such as a tank or vat, and the seed permitted to remain in the solution until the hulls open and separate from the whole kernels, when the kernels rise to and float upon the surface of the liquid, where they are collected and removed to any suitable means for extracting the oil from the kernels. The solution is used at a temperature above normal or from 100° to 150° Fahrenheit and of a strength varying from 2° to about 5° Baumé and the seed retained in the solution from twenty to thirty minutes or longer, according to the age of the seed, completely immersed, when the hulls open and the whole kernels released therefrom rise to the surface. While in the solution the kernels of the seed absorb alkali and become soft, so that they can be readily crushed. In treating seed several years old, and consequently very hard and dry, the temperature of the solution may be increased and the strength of the solution also increased, as neither the increased temperature or the increased strength of the solution injures the kernel for producing oil, but, on the contrary, is an advantage to the kernel in that the hulls and kernels of the seed soften more rapidly and the latter absorb more of the alkali which is carried by the kernels into the oil extracted therefrom and serves a useful purpose in refining the oil.

In the preparation of the solution alkali is supplied until the acidometer indicates 2° Baumé for treating new seed. For seed one or two years old alkali is supplied to the solution until the strength thereof indicates about 4° Baumé, and for seed three or four years old alkali is supplied until the strength of the solution indicates 5° Baumé.

When saccharine matter is used, alkali is supplied to the solution until a strength of about 2° Baumé is indicated by the acidometer, when saccharine matter is added thereto until the acidometer indicates about 4°.

When the seed are treated in bulk or large quantity or when seed several years old are being treated, agitation of the seed in the vat is necessary to allow the kernels to disengage or free themselves from the hulls and the lint.

The preliminary steps of our invention so far as they relate to hulling cotton-seed are claimed in another application for a patent, Serial No. 73,676.

After the kernels have been denuded of their hulls and while soft from exposure to the solution they may be crushed in any suitable manner, as by rolls or a press, preference being given, however, to the former, and the mash collected in a suitable receptacle, such as a tank or vat, where heat is applied to open the oil-cells and evaporate the water and from which it is conducted or pumped into a suitable filter-press for extracting the oil under pressure and filtering the same, or the oil may be extracted in any preferred manner.

The oil extracted from the kernels is permeated or charged with alkali, but not sufficient to break the oil. Therefore more alkali is added until the oil breaks, when it is agitated thirty minutes or more, after which the oil is treated with chlorid of sodium and the agitation continued. The oil is then allowed to settle, after which it is separated from the foots and washed in clear water, when it is ready for further treatment in the art of refining the oil.

For the purpose of illustration the accompanying drawings represent a diagrammatic plan view of means adapted for carrying out our invention and in which 1 indicates a tank or vat in which the kernels may be separated from their hulls; 2, rolls for crushing the kernels; 3, a mash-tank to receive the crushed kernels and the liquid therefrom; 4, a filter-press; 5, an alkali oil-tank; 6, a chlorid-of-sodium oil-tank, and 7 an oil-washing tank; but we do not confine ourselves to these or any other particular means, as others will readily be suggested to persons skilled in the art to which our invention appertains.

Having thus fully described our invention, what we claim is—

1. The process of extracting oil from cotton-seed, which consists in denuding seed of their hulls and softening the whole kernels, and then extracting oil therefrom.

2. The process of extracting oil from cotton-seed, which consists in denuding seed of their hulls and softening the whole kernels, crushing the kernels, and then extracting oil therefrom.

3. The process of extracting oil from cotton-seed, which consists in denuding seed of their hulls, by subjecting the seed to a solution containing alkali until the hulls open and the kernels separate therefrom, and then extracting oil from the kernels.

4. The process of extracting oil from cotton-seed, which consists in subjecting seed to a solution of alkali and saccharine matter in which corrosive agents have been developed until the hulls open and the kernels separate therefrom, and then extracting oil from the kernels.

5. The process of extracting oil from cotton-seed, which consists in subjecting seed to a solution containing alkali until the hulls open and the kernels separate therefrom and the kernels soften, extracting oil from the kernels saturated with alkali, and then refining the oil.

6. The process of extracting oil from cotton-seed, which consists in subjecting seed to a solution containing alkali until the hulls open and the kernels separate therefrom, crushing the kernels, extracting oil from the kernels, then adding alkali to the oil and agitating the oil, then supplying chlorid of sodium to and continuing the agitation of the oil, and then washing the oil.

7. The process of extracting oil from cotton-seed, which consists in denuding seed of their hulls and softening the whole kernels, crushing the kernels, then filtering the mash of kernels and liquid, and then refining the oil.

In testimony whereof we affix our signatures in presence of two witnesses.

JOHN McFARLANE.
DAVID C. REINOHL.

Witnesses:
D. WEIMER REINOHL,
S. A. TERRY.